United States Patent
Hurlin et al.

(10) Patent No.: US 9,382,845 B2
(45) Date of Patent: Jul. 5, 2016

(54) INNER STRUCTURE FOR AN AIRCRAFT NACELLE

(71) Applicant: AIRCELLE, Gonfreville l'Orcher (FR)

(72) Inventors: Herve Hurlin, Igny (FR); Olivier Kerbler, Antony (FR); Olivier Gilo, Versailles (FR)

(73) Assignee: AIRCELLE, Gontreville l'Orcher (*) Notice: Subject to any disclaimer, the term of this patent is extended or adjusted under 35 U.S.C. 154(b) by 574 days.

(21) Appl. No.: 13/922,614

(22) Filed: Jun. 20, 2013

(65) Prior Publication Data

US 2014/0140830 A1    May 22, 2014

Related U.S. Application Data

(63) Continuation of application No. PCT/FR2011/052825, filed on Nov. 30, 2011.

(30) Foreign Application Priority Data

Dec. 20, 2010 (FR) ................................. 10 60816

(51) Int. Cl.
*F02K 1/06* (2006.01)
*F02C 7/20* (2006.01)
*F02K 1/08* (2006.01)

(52) U.S. Cl.
CPC . *F02C 7/20* (2013.01); *F02K 1/085* (2013.01); *Y02T 50/672* (2013.01)

(58) Field of Classification Search
CPC ........... F02C 7/20; F02K 1/085; F01D 25/00; F01C 25/24
See application file for complete search history.

(56) References Cited

U.S. PATENT DOCUMENTS

| 4,196,856 A | * | 4/1980 | James | F02K 1/1223 |
| | | | | 239/265.39 |
| 8,226,027 B2 | | 7/2012 | Journade et al. | |
| 9,133,789 B2 | | 9/2015 | Vauchel | |

FOREIGN PATENT DOCUMENTS

| EP | 2184481 A2 | 5/2010 |
| FR | 2907853 A1 | 5/2008 |
| GB | 2427654 A | 1/2007 |
| RU | 2472678 | 1/2013 |
| RU | 2494273 | 9/2013 |
| WO | 2008045067 A1 | 4/2008 |

* cited by examiner

*Primary Examiner* — Richard Edgar
(74) *Attorney, Agent, or Firm* — Burris Law, PLLC

(57) ABSTRACT

An inner structure for a nacelle for an aircraft turbofan includes a plurality of active and passive movable portions. Each active movable portion can drive adjacent passive movable portions such that the inner structure has a nominal first position, a second position and a third position. In the second position, the active movable portions project beyond by the passive movable portions toward the outside of the inner structure after the active mobile portions have driven the passive mobile portions. In the third position, the active movable portions project beyond the passive movable portions toward the inside of the inner structure after the active mobile portions have driven the passive mobile portions. The present disclosure also relates to a nacelle having an outer structure and such an inner structure.

13 Claims, 5 Drawing Sheets

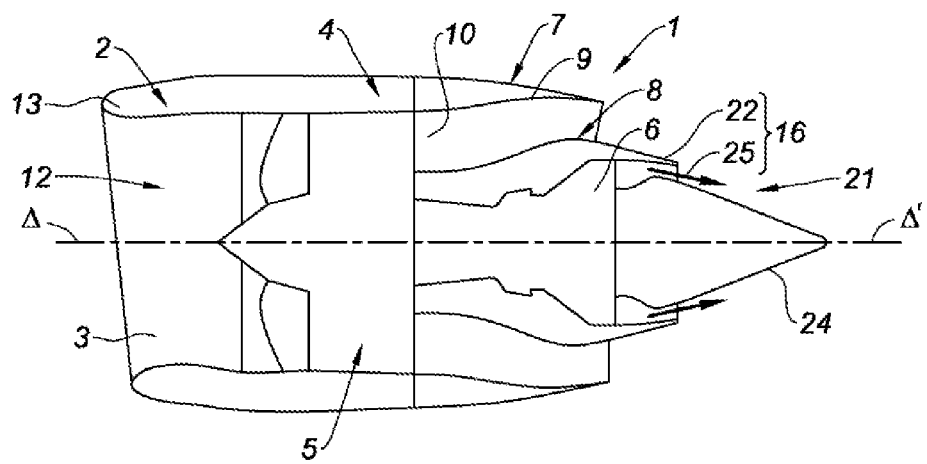
Fig. 1
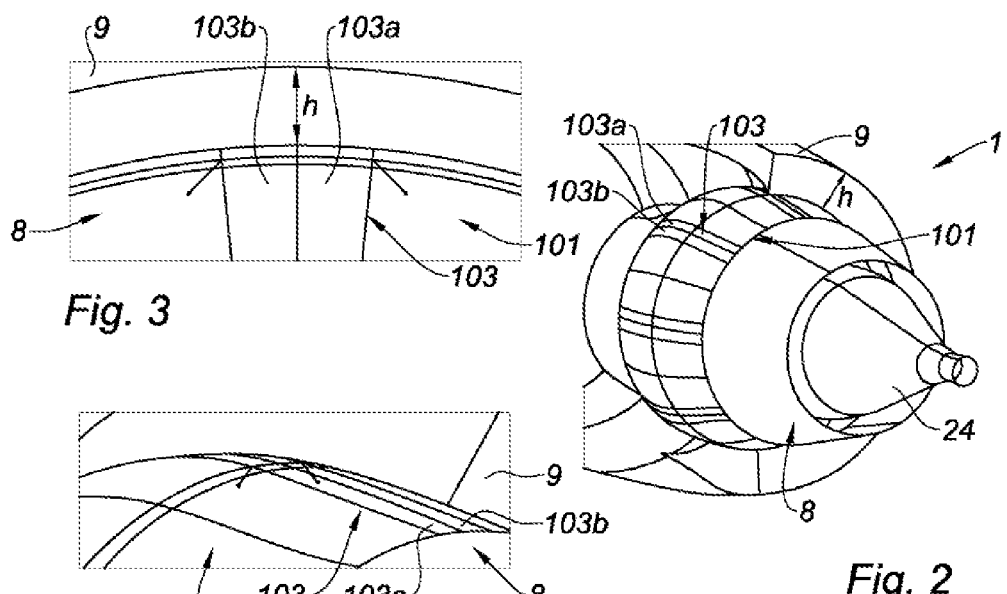
Fig. 3
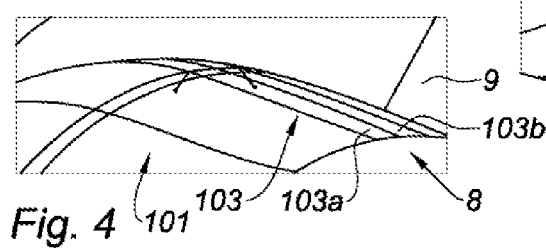
Fig. 4
Fig. 2

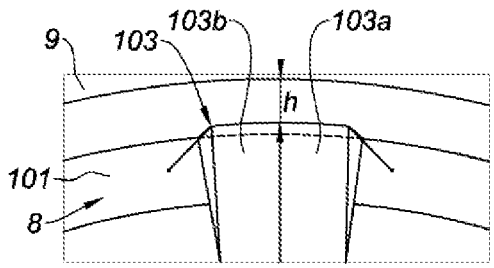
Fig. 6
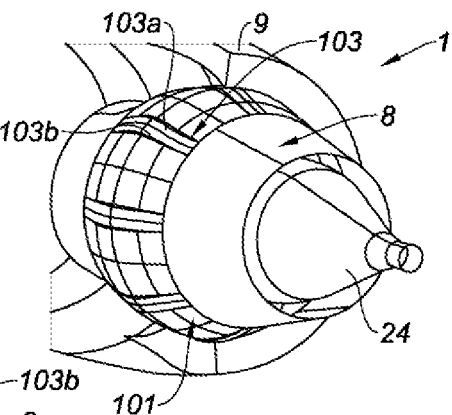
Fig. 5
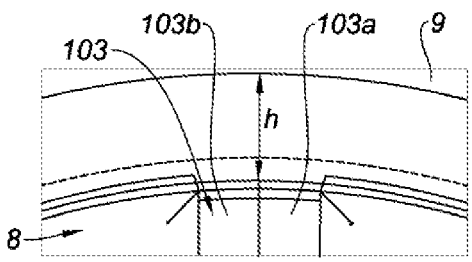
Fig. 7
Fig. 9
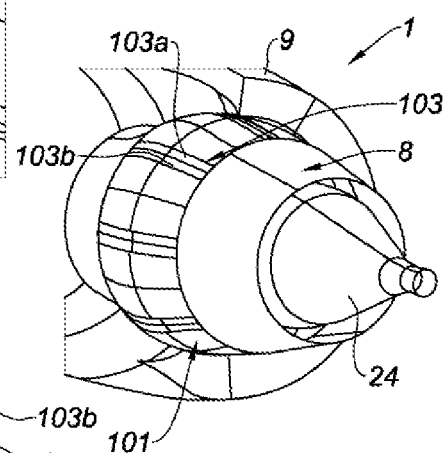
Fig. 8
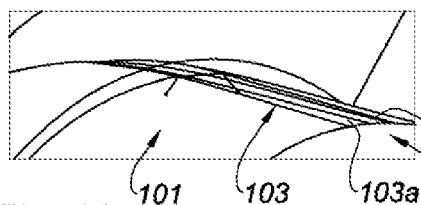
Fig. 10

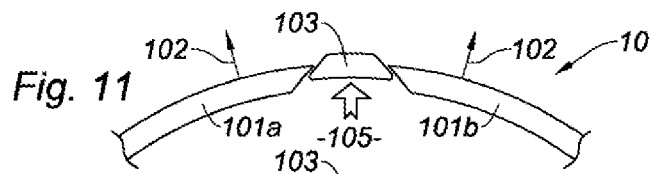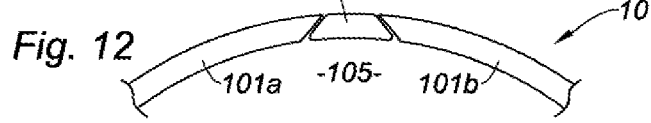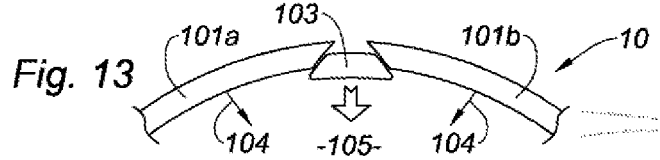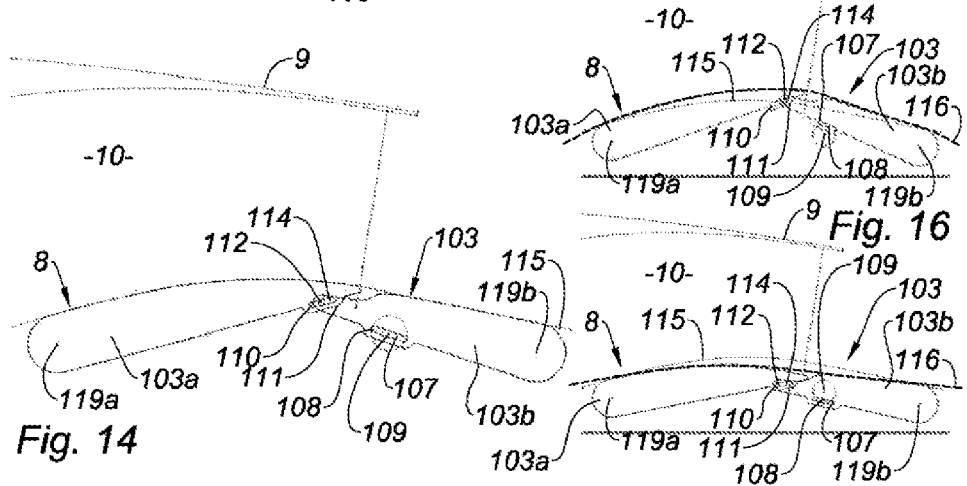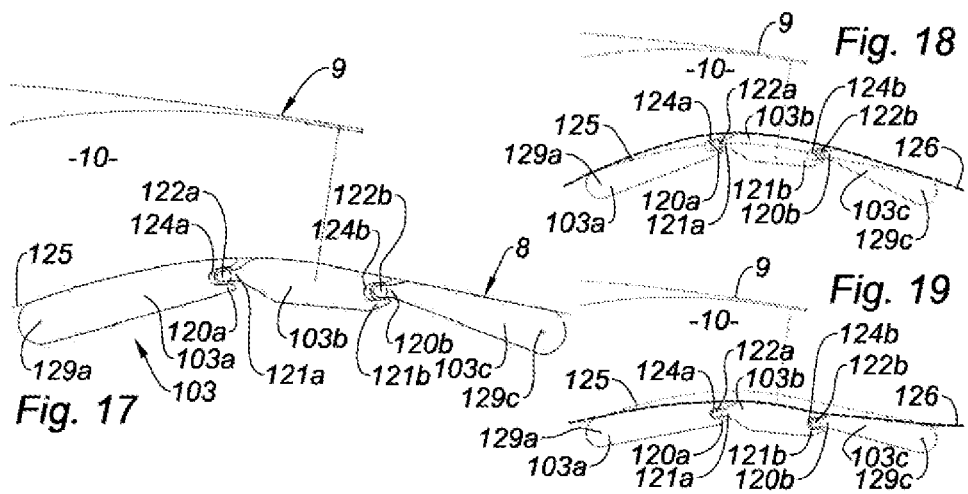

INNER STRUCTURE FOR AN AIRCRAFT NACELLE

CROSS-REFERENCE TO RELATED APPLICATIONS

This application is a continuation of International Application No. PCT/FR2011/052825, filed on Nov. 30, 2011, which claims the benefit of FR 10/60816 filed on Dec. 20, 2010. The disclosures of the above applications are incorporated herein by reference.

FIELD

The present disclosure relates to an inner structure for a nacelle for a turbine engine of an aircraft.

BACKGROUND

The statements in this section merely provide background information related to the present disclosure and may not constitute prior art.

The present disclosure also relates to a nacelle for a turbine engine of an aircraft including an external structure concentrically covering at least one portion of such an inner structure.

An aircraft is driven by several turbine engines each housed in a nacelle also harboring an assembly of ancillary actuation devices related to its operation and ensuring various functions when the turbine engine is operating or at a standstill. These ancillary actuation devices notably comprise a mechanical system for actuating a thrust reverser.

A nacelle generally has a tubular structure along a longitudinal axis comprising an air intake upstream from the turbine engine, a middle section intended to surround a fan of the turbine engine, a downstream section harboring thrust reversal means and intended to surround the combustion chamber of the turbine engine. The tubular structure generally ends with an ejection nozzle, the outlet of which is located downstream from the turbine engine.

Modern nacelles are intended to house a dual flux turbine engine capable of generating via rotating blades of the fan a hot air flow (also called a <<primary flow>>) stemming from the combustion chamber of the turbine engine, and a cold air flow (<<secondary flow>>) which circulates outside the turbine engine through a ring shaped passage also called <<annular vein >>.

By the term of <<downstream>> is meant here the direction corresponding to the direction of the cold air flow penetrating the turbine engine. The term of <<upstream>> designates the opposite direction.

The annular vein is formed by an outer structure, a so-called Outer Fixed Structure (OFS) and a concentric inner structure, called an Inner Fixed Structure (IFS), surrounding the structure of the engine strictly speaking downstream from the fan. The inner and outer structures belong to the downstream section. The outer structure may include one or several sliding cowls along the longitudinal axis of the nacelle between a position allowing the exhaust of the reversed air flow and a position preventing such an exhaust.

Moreover, a plurality of sliding cowls is positioned in the downstream section and has a downstream side forming the ejection nozzle aiming at channeling the ejection of the cold air flow, designated hereafter by <<air flow>>. Each sliding cowl typically has a thrust reversal function. This nozzle provides the power required for propulsion by imparting speed to the ejection flows. This nozzle is associated with an actuation system either independent or not of that of the cowl allowing variation and optimization of the section of the annular vein according to the flight phase in which is found the aircraft.

Customarily, the variable nozzle is formed with mobile elements configured so as to allow a decrease in the ejection section of the airflow at the outlet of the annular vein. These mobile elements are generally actuated by control means.

However, such a variation of the ejection section of the airflow is quite complex to apply. Indeed, this assumes placement of mechanical parts or of an additional system at the sliding cowl. Further, this type of variable nozzle is not easily transposable to other types of nacelle either having or not thrust reversal means.

The present disclosure provides a nacelle, for which the ejection section of the airflow is variable by means which do not have the aforementioned drawbacks.

SUMMARY

For this purpose, according to a first aspect, the present disclosure provides an inner structure for a nacelle for a turbine engine of an aircraft, which is concentric along a longitudinal axis passing through the center of said structure and comprising a plurality of active and passive mobile elements, each active mobile element is formed with one or several mobile portions and each active mobile element is configured so as to drive the adjacent passive mobile elements so that the inner structure has a first rated position in which the active mobile elements are in aerodynamic continuity with the passive mobile elements, a second position in which the active mobile elements jut out from the passive mobile elements towards the outside of the inner structure relatively to the center of the inner structure after the active mobile elements have driven the passive mobile elements and a third position in which the active mobile elements jut out from the passive mobile elements towards the inside of the inner structure relatively to the center of the inner structure, after the active mobile elements have driven the passive mobile elements.

By <<inside of the internal structure relatively to the center of the fixed structure>> is meant here the direction from the fixed base and approaching the center of said fixed structure.

By <<outside of the inner structure relatively to the center of the fixed structure>>, is meant here the direction from the fixed space and extending away from the center of said fixed structure.

By <<active mobile element>> is meant here an element capable of displacing and of becoming a drive for other non-active mobile elements, so-called passive elements, so as to set the latter into motion.

By <<passive mobile element>> is meant here an element capable of being displaced under the driving from at least one active mobile element.

When introduced into a nacelle, the structure of the present disclosure gives the possibility in a simple, reliable and effective way of modifying the size of the ejection section of the airflow outlet.

Consequently, said structure advantageously allows optimization of the operation of the turbine engine and also limitation of noise annoyance in a simple and reversible way.

Further, the inner structure of the present disclosure is independent of the thrust reversal means and may be used in any type of nacelle either comprising such means or not.

According to other characteristics of the present disclosure, the structure of the present disclosure includes one or several of the following optional features considered alone or according to all possible combinations:

- at least two mobile portions cooperate together via a driving end belonging to a driving mobile portion intended to be set into motion and a driven end belonging to one or several mobile portions intended to be driven by the driving mobile portion set into motion which allows mobile elements to be set into motion with a minimum of effort,
- the driven and driving ends cooperate by sliding and/or by rotation which allows simple and efficient driving;
- the driving mobile portions are actuated via control means which allows remote control of the variation of the cross-section of the inner structure;
- the control means comprise a motor-driven system coupled with a position sensor for each mobile portion which allows the mobile portions to be specifically set into motion;
- the control means are located in a strip adjacent to an active mobile element which allows a sufficient space to be cleared for operating the mobile portions;
- each strip includes acoustic processing which allows absorption of the surrounding noise of the inner structure;
- the mobile portion(s) forming an active mobile element is(are) made in a metal or composite material;
- the mobile portion(s) is(are) made in different materials which gives the possibility of adapting each element of the inner structure to its function;
- one or several materials are elastically deformable or thermodeformable by which it is possible not to weigh down the inner structure;
- each portion is formed with one or several longitudinal lamellas which allows simple and effective installation of each active mobile element. According to another aspect, the present disclosure provides a nacelle for a turbine engine of an aircraft including an outer structure concentrically covering at least one portion of an inner structure according to the present disclosure so as to form an annular vein.

Alternatively, at least one portion of the mobile elements of the internal structure is positioned substantially facing the free end of the external structure.

Further areas of applicability will become apparent from the description provided herein. It should be understood that the description and specific examples are intended for purposes of illustration only and are not intended to limit the scope of the present disclosure.

DRAWINGS

In order that the present disclosure may be well understood, there will now be described various forms thereof, given by way of example, reference being made to the accompanying drawings, in which:

FIG. 1 is a partial schematic sectional view of one form of a nacelle of the present disclosure;

FIGS. 2 to 4 are perspective views of another form of the fixed inner structure of the present disclosure in which the active and passive mobile elements are in the rated position;

FIGS. 5 to 7 are perspective views of the form of the fixed internal structure of FIGS. 2 to 4 wherein the active and passive mobile elements penetrate the vein of the nacelle;

FIGS. 8 to 10 are perspective views of the form of the fixed inner structure of FIGS. 2 to 4 wherein the active and passive mobile elements penetrate the inside of the inner structure;

FIGS. 11 to 13 are schematic cross sectional views of a form of the structure of the present disclosure respectively in a position in which the active and passive mobile elements penetrate the annular vein, in the rated position, and in the position in which the active and passive mobile elements penetrate the inside of the fixed inner structure;

FIGS. 14 to 16 are cross-sectional views of another form of the structure of the present disclosure respectively in the rated position, in the position in which the active and passive and mobile elements penetrate the annular vein, and in the position in which the active and passive mobile elements penetrate the inside of the fixed inner structure;

FIGS. 17 to 19 are cross-sectional views of another form of the structure of the present disclosure respectively in the rated position, in the position in which the active and passive and mobile elements penetrate the annular vein, and in the position in which the active and passive mobile elements penetrate the inside of the fixed inner structure;

Figure 20:
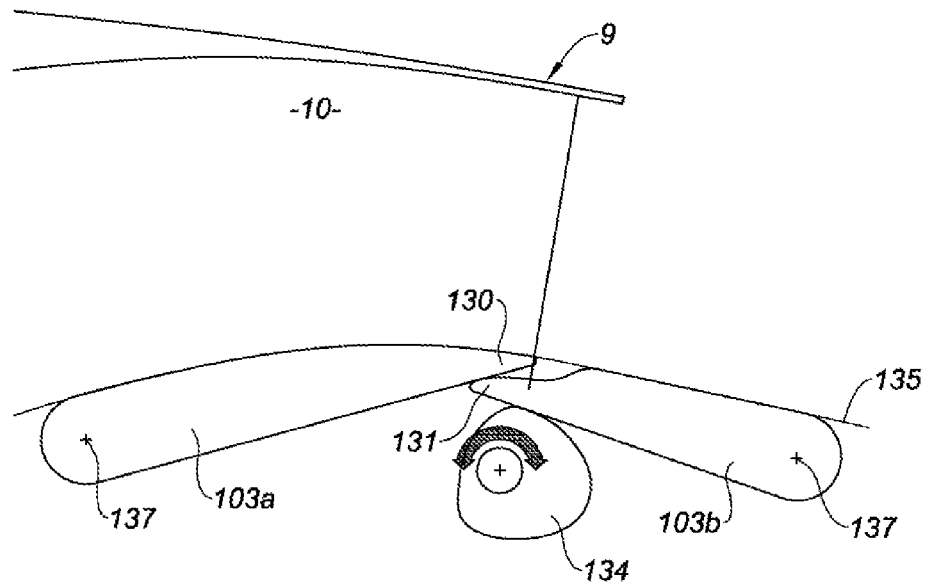
FIGS. 20 to 22 are transverse sectional views of another form of the structure of the present disclosure respectively in the rated position, in the position in which the active and passive mobile elements penetrate the annular vein, and in the position in which the active and passive mobile elements penetrate the inside of the fixed inner structure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

As illustrated in FIG. 1, a nacelle 1 according to the present disclosure has a substantially tubular shape along a longitudinal axis $\Delta$. The nacelle of the present disclosure 1 comprises an upstream section 2 with an air intake lip 13 forming an air intake 3, a middle section 4 surrounding a fan 5 of a turbine engine 6 and an upstream section 7. The upstream section 7 comprises an inner structure 8 (generally called an <<IFS>>) surrounding the upstream portion of the turbine engine 6, an outer structure (OFS) 9 supporting a mobile cowl (not shown) including thrust reversal means.

The IFS 8 and the OFS 9 delimit an annular vein 10 allowing the passage of an air flow 12 penetrating the nacelle 1 of the present disclosure at the air intake 3.

The nacelle of the present disclosure 1 therefore includes walls delimiting a space, such as the air intake 3 or the annular vein 10, into which the airflow 12 penetrates, circulates and is ejected.

The nacelle 1 of the present disclosure ends with an ejection nozzle 21 comprising an outer module 22 and an inner module 24. The inner 24 and outer 22 modules define a flow channel for a hot air stream 25 flowing out of the turbine engine 6.

The IFS 8 has a longitudinal axis $\Delta'$ substantially co-linear with the longitudinal axis $\Delta$ of the nacelle 1 of the present disclosure.

The IFS 8 comprises a plurality of active 103 and passive 101 mobile elements, said active mobile elements 103 are formed by one or several mobile portions 103a, 103b with each other. Each active mobile element 103 is configured so as to drive the adjacent passive mobile elements 101 so that the IFS 8 has a first rated position in which the active mobile elements 103 are in aerodynamic continuity with the passive mobile elements 101 (see FIGS. 2 to 4), a second position in which the active mobile elements 103 jut out from the passive mobile elements 101 towards the outside of the orifice 8, after the active mobile elements 103 have driven the passive mobile elements 101, (see FIGS. 5 to 7) and a third position in which the active mobile elements 103 jut out from the passive mobile elements 101 towards the inside of the IFS 8, after the active mobile elements 103 have driven the passive mobile elements 101 (see FIGS. 8 to 10).

The terms of <<inner>> and <<outer>> are relative to the center of the IFS which substantially corresponds to that of the nacelle.

Consequently when the IFS 8 is mounted in the nacelle 1 of the present disclosure, the annular vein 10 has a more or less great height depending on the positioning of the active 103 and passive 101 mobile elements relatively to the remainder of the IFS 8 which is non-mobile. Consequently, the IFS 8 in a simple and efficient way gives the possibility of optimizing the operation of the turbine engine 6 and of reducing noise annoyances.

Further, the IFS 8 is independent of the mobile cowls of the OFS 9 and may be used in any type of nacelle either comprising thrust reversing means or not.

More specifically, according to the form of FIGS. 2 to 4, the cross section of the IFS 8 is in the rated position, i.e. the elements forming the IFS are in aerodynamic continuity. The annular vein 10 has constant height perpendicularly to the longitudinal axis Δ.

According to the forms of FIGS. 5 to 7, the cross section of the IFS is no longer in aerodynamic continuity at the active mobile element 103 which penetrates the annular vein 10, consequently reducing the height of the latter. This configuration is advantageous since it gives the possibility of having better operation of the turbine engine 6 with a strong dilution rate in the descent or cruising phase.

According to the forms of FIGS. 8 to 10, the transverse section of the IFS is no longer in aerodynamic continuity at the active mobile element 103 which penetrates the inside of the IFS 8, consequently increasing the height of the annular vein 10. This configuration is adapted to the operation of the fan in the case of a strong thrust, at take-off or during the ascent phase in altitude.

As illustrated in FIGS. 11 to 13, the active mobile elements 103 may drive the passive mobile elements 101 so as to keep an aerodynamic line. Thus, in the case of FIG. 11, the active mobile elements 103 penetrate the annular vein 10 consequently pushing back the passive mobile elements 101*a* and 101*b*. The passive mobile elements 101*a* and 101*b* are moved away relatively to the rated position illustrated in FIG. 10, as indicated by the arrows 102.

Thus, in the case of FIG. 13, the active mobile elements 103 penetrate the inside 105 of the IFS, consequently bringing the passive mobile elements 101*a* and 101*b* closer to each other. The passive mobile elements 101*a* and 101*b* are thus brought closer relatively to the rated position illustrated in FIG. 12, as indicated by the arrows 104.

The active mobile elements 103 are formed by one or several portions. Each active portion 103*a*, 103*b* may be formed with one or several longitudinal lamellas which allows the simple and effective installation of each active mobile element 103. Indeed, the longitudinal lamellas are simple to install since said lamellas may be sufficiently flexible for allowing the displacement of the portions 103*a* and 103*b*. Said lamellas may be translationally guided at one end and attached with screws to another end for example. The longitudinal lamellas may be flexible. Said lamellas may be made in a metal or composite material.

At least two mobile portions may cooperate with each other via a driving end belonging to a driving mobile portion intended to be set into motion and a driven end belonging to one or several mobile portions intended to be driven by the driving mobile portion set into motion which gives the possibility of setting the active mobile elements 103 into motion with a minimum effort.

The driven and driving ends may cooperate by sliding and/or by rotation which causes simple and efficient driving.

According to a first form illustrated in FIGS. 14 to 16, the active mobile elements 103 are formed by two portions 103*a* and 103*b* mounted on the periphery of the nacelle 1 of the present disclosure.

According to this form, the driving mobile portion 103*b* may be mobile in rotation along an off-center axis. To do this, said mobile portion 103*b* may include a closed slot 107 capable of receiving a rotatably mounted pin 108 along an off-center axis of rotation 109 relative to said mobile portion 103*b*.

The driving mobile portion 103*b* may comprise a driving end 111 intended to drive the driven end 110 of the driven mobile portion 103*a*. To do this, the driven end 110 includes a closed slot 114 intended to receive a pin 112 belonging to the driving end 111. The mobile portions 103*a* and 103*b* are rotationally mobile following an axis of rotation 119*a* and 119*b* substantially perpendicular to the longitudinal axis Δ', said axis being positioned at a distance from the driving 111 and driven 110 ends.

Thus, depending on the position of the pin 112 in the closed slot 114, both mobile portions 103*a* and 103*b* define an aerodynamic line 116 positioned above (see FIG. 15) or below (see FIG. 16) the aerodynamic line 115 corresponding to the rated position of the mobile portion, relatively to the center of the IFS 8.

In the case of FIG. 15, the section of the annular vein 10 is reduced while that of FIG. 16 is increased.

According to a second form of FIGS. 17 to 19, each active mobile element 103 is formed with three portions 103*a*, 103*b* and 103*c*. The portions 103*a*, 103*b* and 103*c* cooperate in a mobile and sliding way with each other at their ends.

According to the form of FIGS. 17 to 19, the driving mobile portion 103*b* includes two different driving ends 121*a* and 121*b*. The driving end 121*a* has a pin 122*a* configured for entering an open slot 124*a* of a driven end 120*a* of the mobile portion 103*a*. The driving end 121*b* has an open slot 124*b* configured for receiving the pin 122*b* of a driven end 120*b* of the mobile portion 103*c*.

When the driving portion 103*a* is set into motion, the pin 122*a* of the driving end presses on one of the walls of the open slot 124*a* consequently setting the mobile portion 103*a* into motion. The open slot 124*b* of the driving end guides the pin 122*b* of the driven end 103*c* so as to set the driven mobile portion 103*c* into motion.

The driven mobile portions 103*a* and 103*c* are made rotationally mobile by means of a pivot 129*a* and 129*c* along an axis substantially perpendicular to the longitudinal axis Δ', said pivot 129*a* and 129*c* being positioned at a distance from the driving 121 and driven 120 ends.

Thus, depending on the position of the pins 122*a* and 122*b* in the open slots 124*a* and 124*b*, the three mobile portions 103*a*, 103*b* and 103*c* define an aerodynamic line 126 positioned above (see FIG. 18) or below (see FIG. 19) the aerodynamic line 125 corresponding to the rated position of the mobile portions 103*a*, 103*b* and 103*c*, relatively to the center of the IFS 8.

In the case of FIG. 18, the section of the annular vein 10 is reduced while that of FIG. 19 is increased.

Figure 21:
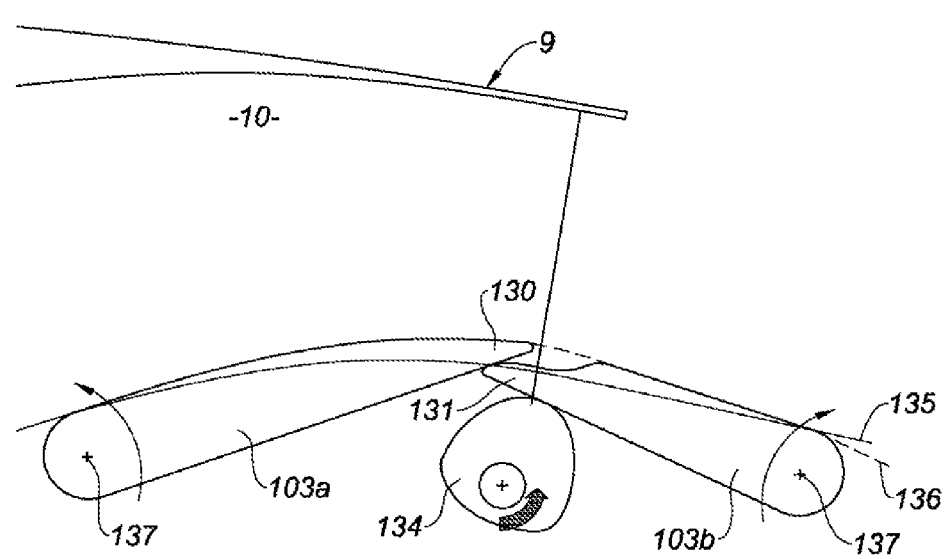
Figure 22:
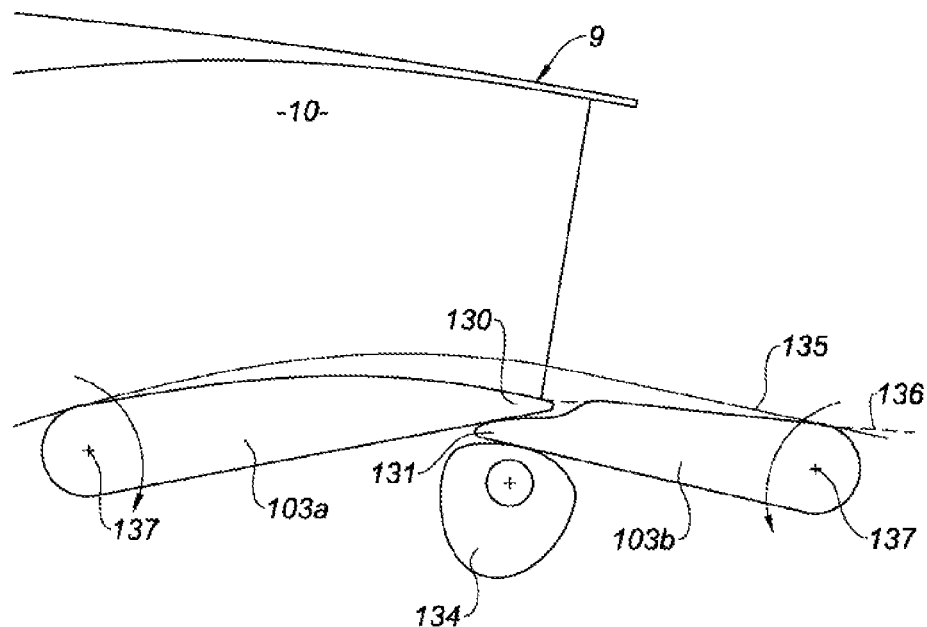

According to another further form illustrated in FIGS. 20 to 22, each active mobile element 103 may comprise two mobile portions 103a and 103b. In this case, the driving mobile portion 103b includes a driving end 131 in contact with the driven end 130 of the driven mobile portion 103a. Typically, the driving end 131 is substantially located under the driven end 130 so that the driving end 131 supports the driven end 130. The driving end 131 is also in contact with a rotationally mobile cam 134 along an axis substantially perpendicular to the longitudinal axis Δ'. Both mobile portions 103a and 130b are rotationally mobile along an axis 137 substantially perpendicular to the longitudinal axis Δ', said axis 137 being positioned at a distance from the driving 131 and driven 130 ends.

Consequently, the driven end 130 presses on the driving end 131, the position of which under the driven end 130 varies according to the angle of the cam 134.

Thus, depending on the angular position of the cam 134, both mobile portions 103a and 103b define an aerodynamic line 136 positioned above (see FIG. 21) or below (see FIG. 22) the aerodynamic line 135 corresponding to the rated position of the mobile portions 103a and 103b, relatively to the center of the IFS 8.

In the case of FIG. 21, the section of the annular vein 10 is reduced while that of FIG. 22 is increased.

Typically, the nozzle outlet section formed by the IFS 8 and the OFS 9 may have a height either increased or decreased by a value comprised between 5% and 10%. To do this, typically, the rotationally mobile portion(s) is(are) rotationally mobile according to an angle equal to about 7°, this angle value may vary depending on the geometry of the elements.

A cover or a gasket system may be provided on the surface of the IFS 8 in contact with the air flow so as to ensure continuity of the aerodynamic surface.

The driving mobile portions 103 are actuated via control means (not shown) which gives the possibility of remotely controlling the variation of the cross section of the IFS 8.

The control means may comprise a motor driven system coupled with a position sensor of one or several mobile portions of the active mobile element which gives the possibility of specifically setting the mobile portions into motion. The driving and position sensor systems of each mobile portion may be a system based on deformations of a structure consisting of piezoelectric elements.

The control means may be located in a neighboring strip and in contact with the active mobile elements which allows clearing of a sufficient space for operating the mobile portions. In this case and in the case when the sensor is a piezoelectric system, a piezoelectric strip may be attached onto said strip, notably towards the outside of the IFS 8. In the case when the control and position sensor systems are piezoelectric systems, the latter may be attached on a same and single strip.

Each strip may include acoustic processing which gives the possibility of limiting the noise emitted by the propulsion unit comprising the nacelle and the turbine engine.

The acoustic processing may be achieved with a perforated or porous skin covering an absorbing acoustic coating positioned towards the inside of the IFS 8.

In one alternative, an acoustically processed strip may be made as an outer skin positioned towards the outside of the IFS 8 and as an inner skin positioned towards the inside of the IFS 8. The outer skin may be pierced or have sufficient porosity for absorbing the surrounding noise. The outer skin may be made in a flexible composite material of the glass, carbon, epoxy resin type or equivalent. The inner skin may be made in a more flexible material than that of the outer skin, such as an elastomer. The inner skin may also be made in several portions connected together through an elastomer.

The inner skin and the outer skin may sandwich a felt such as Feltmetal®, or a honeycomb panel treated so as to have flexibility compatible with the inner and outer skins.

The mobile portions may be made in different materials which gives the possibility of adapting each element of the inner structure to its function.

One or several materials used may be elastically deformable or thermodeformable, i.e. deformable depending on heat, which gives the possibility of not weighing down the IFS.

Of course, the features described within the scope of the forms described above may be taken individually or combined together without departing from the scope of the present disclosure.

What is claimed is:

1. An inner structure for a nacelle for a turbine engine of an aircraft, concentric along a longitudinal axis passing through the center of said structure and comprising a plurality of active and passive mobile elements, each active mobile element is formed with one or several mobile portions and each active mobile element is configured so as to drive adjacent passive mobile elements so that the inner structure has a first rated position in which the active mobile elements are in aerodynamic continuity with the passive mobile elements, a second position in which the active mobile elements jut out from the passive mobile elements towards the outside of the inner structure relative to the center of the inner structure after the active mobile elements have driven the passive mobile elements and a third position in which the active mobile elements jut out from the passive mobile elements towards the inside of the inner structure relative to the center of the inner structure, after the active mobile elements have driven the passive mobile elements.

2. The structure according to claim 1, wherein at least two mobile portions cooperate with each other via a driving end belonging to a driving mobile portion set into motion and a driven end belonging to one or several mobile portions driven by the driving mobile portion set into motion.

3. The structure according to claim 2, wherein the driven and driving ends cooperate by sliding and/or by rotation.

4. The structure according to claim 2, wherein the driving mobile portion is actuated via control means.

5. The structure according to claim 4, wherein the control means comprise a motor-driven system coupled with a position sensor of each mobile portion.

6. The structure according to claim 4, wherein the control means are located in a strip adjacent to an active mobile element.

7. The structure according to claim 6, wherein each strip includes acoustic processing.

8. The structure according to claim 1, wherein the mobile portion(s) forming an active mobile element is (are) made in a metal or composite material.

9. The structure according to claim 1, wherein the mobile portion(s) is (are) made in different materials.

10. The structure according to claim 8, wherein one or several materials are elastically deformable or thermodeformable.

11. The structure according to claim 1, wherein each portion is formed with one or several longitudinal lamellas.

12. A nacelle for a turbine engine of an aircraft including an outer structure concentrically covering at least one portion of an inner structure according to claim 1, so as to form an annular veil.

13. The nacelle according to claim 1, wherein at least one portion of the mobile elements of the inner structure (8) is substantially positioned facing the free end of the outer structure (9).

\* \* \* \* \*